United States Patent
Eide et al.

(10) Patent No.: US 8,572,611 B2
(45) Date of Patent: Oct. 29, 2013

(54) MANAGING CONFLICTS BETWEEN MULTIPLE USERS ACCESSING A COMPUTER SYSTEM HAVING SHARED RESOURCES ASSIGNED TO ONE OR MORE LOGICAL PARTITIONS AND ONE OR MORE APPLIANCE PARTITIONS

(75) Inventors: Curtis S. Eide, Rochester, MN (US); Aditya Kumar, Austin, TX (US); Steven E. Vaughan, Rochester, MN (US); Bradley J. Vette, Rochester, MN (US); Kevin Wendzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 12/716,413

(22) Filed: Mar. 3, 2010

(65) Prior Publication Data
US 2011/0219371 A1    Sep. 8, 2011

(51) Int. Cl.
*G06F 9/455*    (2006.01)
*G06F 9/46*     (2006.01)
*G06F 21/00*    (2013.01)
*G06F 17/00*    (2006.01)
*G06F 7/04*     (2006.01)

(52) U.S. Cl.
USPC ............... 718/1; 718/104; 713/182; 713/185; 726/1; 726/2

(58) Field of Classification Search
None
See application file for complete search history.

(56) References Cited

U.S. PATENT DOCUMENTS

| | | | |
|---|---|---|---|
| 7,246,174 B2* | 7/2007 | Sciandra et al. | 718/104 |
| 7,984,483 B2* | 7/2011 | Leitz et al. | 726/2 |
| 2010/0081417 A1* | 4/2010 | Hickie | 455/414.1 |

\* cited by examiner

Primary Examiner — Jennifer To
Assistant Examiner — Bing Zhao
(74) Attorney, Agent, or Firm — Matthew J. Bussan

(57) ABSTRACT

A management system for managing computer resources assigned by a hypervisor to one or more logical partitions and/or one or more appliance partitions in a multi-user computer system receives login information from a new user logging into the computer system through a service interface (e.g. a hardware management console) or a non-service interface, builds a conflict list, and sends the conflict list for presentation to the new user. The new user is notified of any users that are logged into any part of the computer system that could conflict with the new user's actions. Such users may be logged into the computer system through service and/or non-service interfaces. In one embodiment, the new user can choose to continue logging in irrespective of any conflicts shown. After choosing to continue, the new user is preferably requested to input an end-time. This end-time may be displayed, in turn, to all subsequent users that log into any part of the computer system that could cause conflict. The management system is preferably a component of the hypervisor.

24 Claims, 10 Drawing Sheets

856

| Interface ID | User ID string | Start time | End time | Optional Descriptive string |
|---|---|---|---|---|
| HMC1 | Hscroot | 11/13/09 5:00am | 11/13/09 12:00pm | Fru replacement Ph: 3-1023 |
| Partition3 | Janedoe | 11/13/09 8:00am | 11/13/09 5:00pm | Data entry |
| | | | | |

FIG. 10

| Interface ID | User ID string | Start time | End time | Optional Descriptive string |
|---|---|---|---|---|
| HMC1 | Hscroot | 11/13/09 5:00am | 11/13/09 12:00pm | Fru replacement Ph: 3-1023 |

MANAGING CONFLICTS BETWEEN MULTIPLE USERS ACCESSING A COMPUTER SYSTEM HAVING SHARED RESOURCES ASSIGNED TO ONE OR MORE LOGICAL PARTITIONS AND ONE OR MORE APPLIANCE PARTITIONS

BACKGROUND OF THE INVENTION

1. Field of Invention

The present invention relates in general to the data processing field. More particularly, the present invention relates to a method, apparatus and computer program product for managing resources assigned to one or more logical partitions and/or one or more appliance partitions in a multi-user computer system.

2. Background Art

Computer systems typically include a combination of hardware and software. The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources into different computing environments. Such a computer system is often referred to as a multipartitioned computer system. The IBM Power Systems (formerly IBM System i and System p) computer system developed by International Business Machines Corporation is an example of a computer system that supports logical partitioning. If logical partitioning on such a computer system is desired, partition manager code (referred to herein as a "hypervisor") is installed that allows defining different computing environments on the same platform. Once the hypervisor is installed, logical partitions may be created that define different computing environments. The hypervisor manages the logical partitions to assure that they can share needed resources in the computer system while maintaining the separate computing environments defined by the logical partitions.

A computer system that includes multiple logical partitions typically shares resources (e.g., processors, memory, persistent storage, and other physical hardware) amongst the logical partitions. For example, a computer system with a single CPU could have two logical partitions defined, with 50% of the CPU assigned to each logical partition, with 33% of the memory assigned to the first logical partition and 67% of the memory assigned to the second logical partition, and with two different I/O slots assigned to the two logical partitions, one per partition. Once logical partitions are defined and shared resources are assigned to the logical partitions, each logical partition acts as a separate computer system. Thus, in the example above that has a single computer system with two logical partitions, the two logical partitions will appear for all practical purposes to be two separate and distinct computer systems.

Input/Output (I/O) adapters can be exclusively assigned to (also referred to herein as being "owned by") logical partitions (LPARs) or shared by LPARs through an appliance partition known as a virtual I/O server (VIOS) partition. For example, a VIOS partition allows Ethernet and storage devices to be virtualized and served out to LPARS on a server. The actual physical hardware is owned by the VIOS partition, while the LPARs own virtual devices associated with the physical hardware. As a result, the VIOS partition is considered a service partition with authority to make any changes to the hardware, which in turn could affect the virtual devices being used by the LPARs. The LPARs do not have any direct access to the physical hardware owned by the VIOS partition.

Operations of the different partitions in one or more computer systems may be controlled through a hardware management console (HMC), which is a form of a service partition. In one embodiment, a hardware management console is a separate computer system from which a system administrator, for example, may perform various functions including assignment of hardware resources to each logical partition, as well as reassignment of resources to different logical partitions. In other embodiments, a hardware management console may be installed directly on the system being managed (e.g., IBM's Integrated Virtualization Manager, VMWare Server).

Servers and other computer systems generally support multiple methods for access to partitions, both through service interfaces, such as hardware management consoles, and non-service interfaces. As a result, there is always the potential for a user of a computer system to step on another user of the computer system unknowingly.

In a multi-user server environment, for example, there are typically multiple operating systems, a system management utility, and a hypervisor—with all these areas owning/using different pieces of hardware. So, no one area has full knowledge of what actions are taking place elsewhere on the computer system. Therefore, determining that one action will cause a conflict with another is not always very straight forward (but could be in some situations).

Conventional management systems for managing the partitions are based on calendar entries. Unfortunately, the users of computer systems having such conventional management systems must be regimented about their use. Forgetting to make an entry, check entries, or making a mistake in the calendar can result in two different users logging on to different parts of the same computer system and causing issues for each other.

For example, there may be a server administrator using a hardware management console (HMC) to work on a serviceability action for hardware owned by a partition while another user is trying to run tasks on the partition that requires that same hardware. Today there exists no way for these users to realize that they could cause issues for one another unless both users are regular with the conventional management system's calendars and both users remember to verify the calendar entries. With the complexity of computer systems such as servers, there are often multiple administrators and they too could cause conflicts of the computer system if the conventional management system's calendar is not adhered to regularly.

Thus, while conventional management systems attempt to prevent these issues from occurring, they occur nonetheless because such systems depend on the users' awareness and regularity with respect to calendar updates and verification. The safeguards that are provided through such conventional management systems are no longer sufficient, especially given the size and complexity of computer systems such as servers and the number of partitions the users' may be dealing with.

Therefore, a need exists for an enhanced mechanism for managing resources assigned to one or more logical partitions and/or one or more appliance partitions in a multi-user computer system.

SUMMARY OF THE INVENTION

According to the preferred embodiments of the present invention, a management system for managing computer resources assigned by a hypervisor to one or more logical partitions and/or one or more appliance partitions in a multi-user computer system receives login information from a new user logging into the computer system through a service interface (e.g. a hardware management console) or a non-service interface, builds a conflict list, and sends the conflict list for presentation to the new user. The new user is notified of any users that are logged into any part of the computer system that could conflict with the new user's actions. Such users may be logged into the computer system through service and/or non-service interfaces. In one embodiment, the new user can choose to continue logging in irrespective of any conflicts shown. After choosing to continue, the new user is preferably requested to input an end-time. This end-time may be displayed, in turn, to all subsequent users that log into any part of the computer system that could cause conflict. The management system is preferably a component of the hypervisor.

BRIEF DESCRIPTION OF THE DRAWINGS

The preferred exemplary embodiments of the present invention will hereinafter be described in conjunction with the appended drawings, where like designations denote like elements.

FIG. 10 is a diagram illustrating an exemplary data structure of the surveillance list in FIG. 8. The surveillance list in FIG. 10 is discussed in Example 1.

FIG. 11 is a diagram illustrating an exemplary data structure of the conflict list in FIG. 8. The conflict list in FIG. 11 is discussed in Example 1.

DETAILED DESCRIPTION OF THE PREFERRED EMBODIMENTS

1. Overview

In accordance with the preferred embodiments of the present invention, a management system for managing computer resources assigned by a hypervisor to one or more logical partitions and/or one or more appliance partitions in a multi-user computer system receives login information from a new user logging into the computer system through a service interface (e.g. a hardware management console) or a non-service interface, builds a conflict list, and sends the conflict list for presentation to the new user. The new user is notified of any users that are logged into any part of the computer system that could conflict with the new user's actions. Such users may be logged into the computer system through service and/or non-service interfaces. In one embodiment, the new user can choose to continue logging in irrespective of any conflicts shown. After choosing to continue, the new user is preferably requested to input an end-time. This end-time may be displayed, in turn, to all subsequent users that log into any part of the computer system that could cause conflict. The management system is preferably a component of the hypervisor.

2. Detailed Description

In the embodiment shown in FIG. 1, described further below, the computer system 100 is a logically-partitioned platform. For those not familiar with the concepts of logical partitions, background information is provided below with reference to FIGS. 2-5 that will help to understand the present invention.

Figure 2:
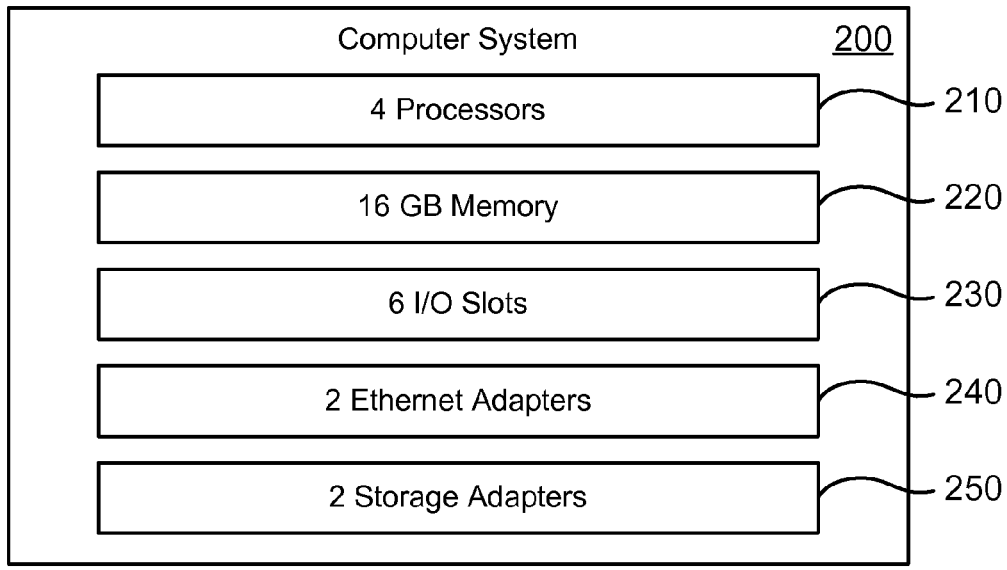
FIG. 2 is a block diagram of a prior art computer system before logical partitioning.

As stated in the Background Art section above, a computer system may be logically partitioned to create multiple virtual machines on a single computer platform. Referring to FIG. 2, an exemplary computer system 200 is shown to include four processors 210, 16 GB of main memory 220, six I/O slots 230, two Ethernet adapters 240, and two storage adapters 250. Note that there may be many other components inside a prior art computer system that are not shown in FIG. 2 for the purpose of simplifying the discussion herein.

Figure 3:
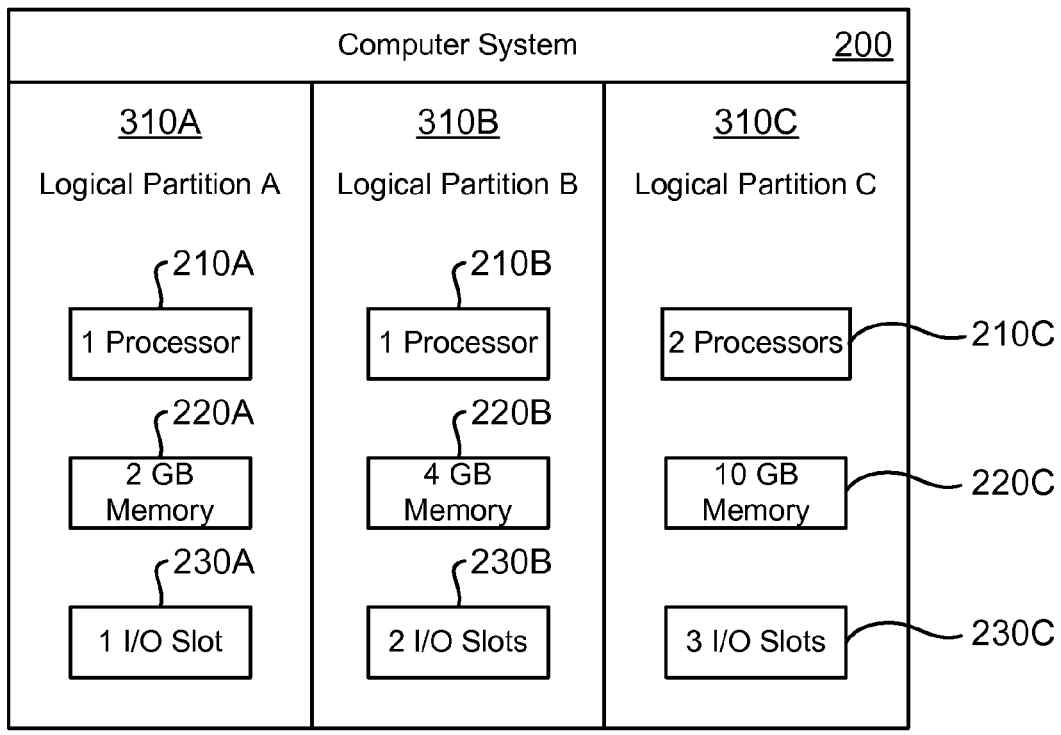
FIG. 3 is a block diagram of the prior art computer system in FIG. 2 after logical partitioning.

We now assume that the computer system 200 is configured with three logical partitions, as shown in FIG. 3. The first logical partition 310A is defined to have one processor 210A, 2GB of memory 220A, and one I/O slot 230A. The second logical partition 310B is defined to have one processor 210B, 4 GB of memory 220B, and two I/O slots 230B. The third logical partition 310C is defined to have two processors 210C, 10GB of memory 220C, and three I/O slots 230C. Note that the total number of processors (210A+210B+210C) equals the four processors 210 in the computer system 200. Likewise for the memory and the I/O slots. This is a simplified example. There can be unassigned/free resources (e.g., not all CPUs need to belong to some partition at some point in time).

Input/Output (I/O) adapters, such as the two Ethernet adapters 240 and the two storage adapters 250, can be exclusively assigned to (also referred to herein as being "owned by") logical partitions (LPARs) or shared by LPARs through an appliance partition known as a virtual I/O server (VIOS) partition. A VIOS partition allows Ethernet and storage devices, for example, to be virtualized and served out to LPARS (also referred to herein as "client partitions") on a server. The actual physical hardware is owned by the VIOS partition, while the LPARs own virtual devices associated with the physical hardware. As a result, the VIOS partition is considered a service partition with authority to make any changes to the hardware, which in turn could affect the virtual devices being used by the LPARs. The LPARs do not have any direct access to the physical hardware owned by the VIOS partition.

Figure 4:
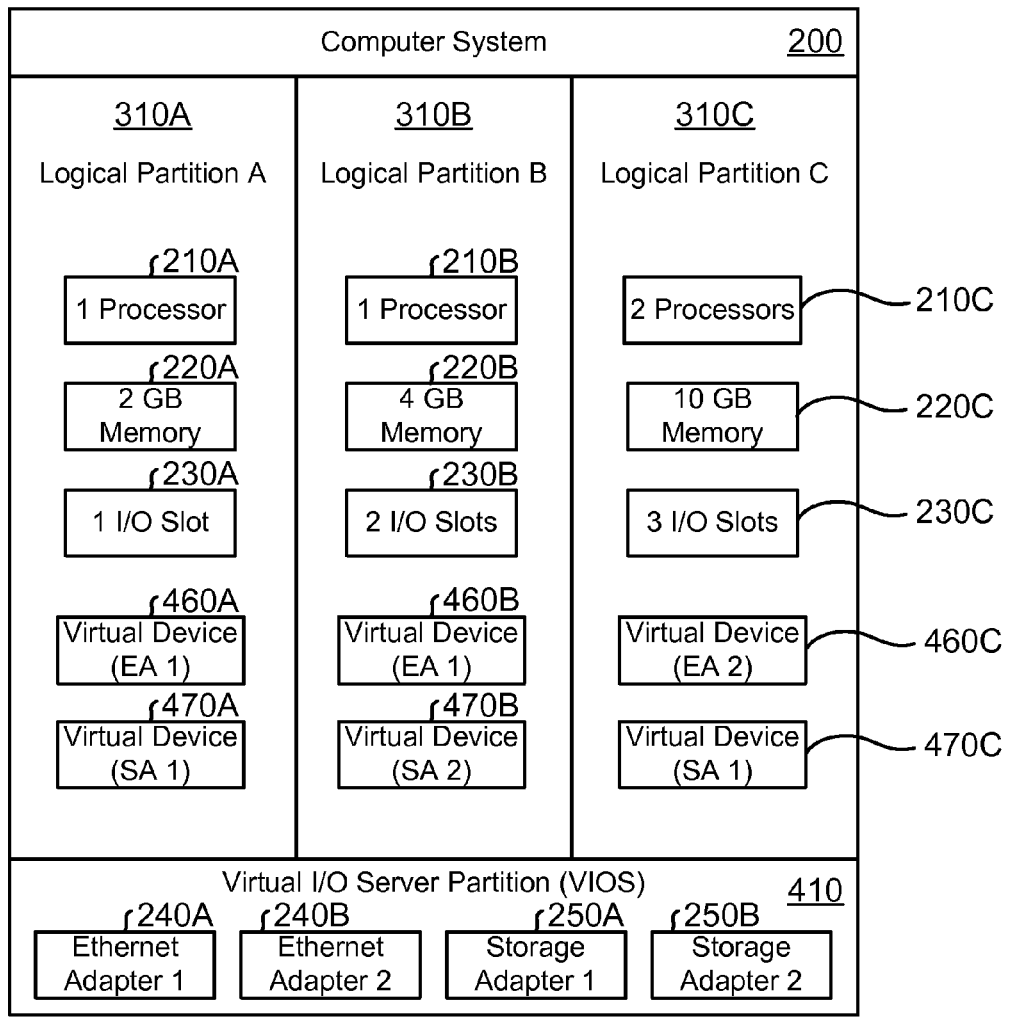
FIG. 4 is a block diagram of the prior art computer system in FIG. 2 after assigning resources to logical partitions and a virtual I/O server (VIOS) partition.

FIG. 4 is a block diagram of the prior art computer system in FIG. 2 after assigning resources to a VIOS partition 410 as well as to the logical partitions 310A, 310B and 310C. The two Ethernet adapters 240A and 240B and the two storage adapters 250A and 250B are assigned to the VIOS partition 410. Virtual devices 460A and 470A are assigned to the first logical partition 310A, along with one processor 210A, 2GB of memory 220A, and one I/O slot 230A. Virtual devices 460B and 470B are assigned to the second logical partition 310B, along with one processor 210B, 4GB of memory 220B, and two I/O slots 230B. Virtual devices 460C and 470C are assigned to the third logical partition 310C, along with two processors 210C, 10GB of memory 220C, and three I/O slots 230C. The virtual devices 460A and 460B are associated with the first Ethernet adapter 240A (this association is denoted in FIG. 4 as a parenthetical legend "EA 1" in the virtual devices 460A and 460B). The virtual device 460C is associated with the second Ethernet adapter 240B (this association is denoted in FIG. 4 as a parenthetical legend "EA 2" in the virtual device 460C). The virtual devices 470A and 470C are associated with the first storage adapter 250A (this association is denoted in FIG. 4 as a parenthetical legend "SA 1" in the virtual devices 470A and 470C). The virtual device 470B is associated with the second storage adapter 250B (this association is denoted in FIG. 4 as a parenthetical legend "SA 2" in the virtual device 470B).

Figure 5:
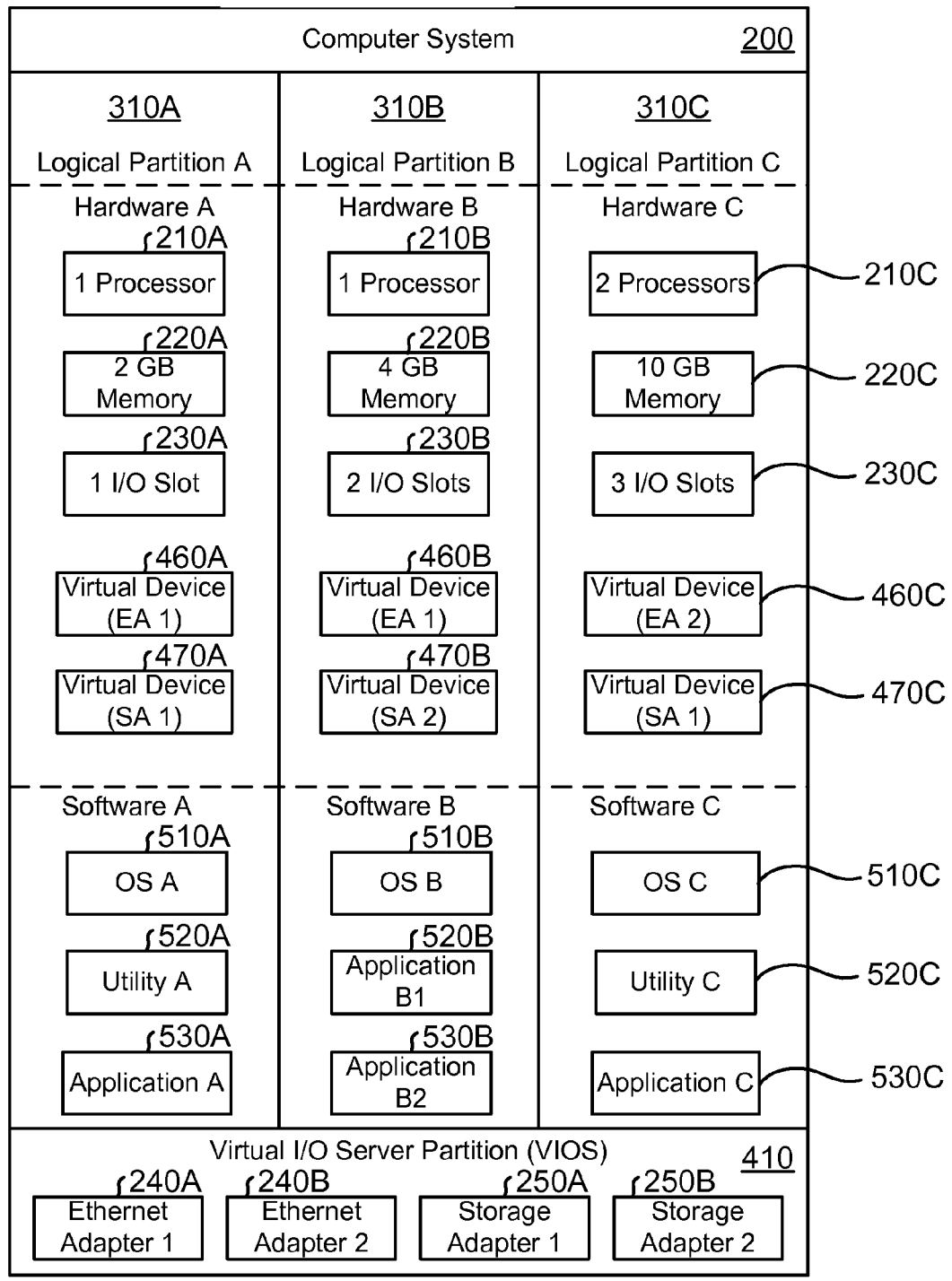
FIG. 5 is a block diagram of the prior art computer system in FIG. 4 after installing an operating system and other software in each logical partition.

Now that hardware resources have been assigned to the logical partitions and the VIOS partition, software may be installed, as shown in FIG. 5. First, an operating system is typically installed in each partition, followed by utilities or applications as the specific performance needs of each partition require. Thus, for example in FIG. 5, the first logical partition 310A includes an operating system 510A, a utility 520A, and an application 530A. The second logical partition 310B includes an operating system 510B, and two applications 520B and 530B. The third logical partition 310C includes an operating system 510C, a utility 520C, and an application 530C. Once the software is installed in the logical partitions as shown in FIG. 5, the logically-partitioned computer system 200 is ready for use.

In a multi-user server environment, such as the logically-partitioned computer system 200, there are typically multiple operating systems, a system management utility, and a hypervisor—with all these areas owning/using different pieces of hardware. So, no one area has full knowledge of what actions are taking place elsewhere on the computer system. Therefore, determining that one action will cause a conflict with another is not very straight forward. An objective of a management system in accordance with the preferred embodiments of the present invention is to help alleviate this lack of knowledge by centralizing user information and providing a means of communication with all of the various areas (e.g., operating system (OS), hardware management console (HMC), and hypervisor) to inform users of potential problems. Also in accordance with the preferred embodiments of the present invention, this communication is secure and will not cause any exposures.

According to the preferred embodiments of the present invention, the management system is utilized to help prevent various users from stepping on each other while using the same server or other computer system. The management system, which is preferably a component of the hypervisor, is login based. Login information obtained during a login procedure (e.g., the exemplary login algorithm shown in FIG. 7, discussed below) is utilized by the management system to manage computer resources assigned by the hypervisor to one or more logical partitions and/or one or more appliance partitions in the server or other computer system. The management system receives this login information from a new user logging into the computer system through either a service interface (e.g. a hardware management console) or a non-service interface, builds a conflict list, and sends the conflict list for presentation to the new user.

While logging in (i.e., once the management system has received the new user's login information), the new user will be shown any users that are logged into any part of the server or other computer system that could conflict with the new user's actions. Such users may be logged into the server or other computer system through one or more service interfaces and/or one or more non-service interfaces.

One skilled in the art will appreciate that subsequent actions made available to the new user by the management system are embodiment dependent. For example, in the exemplary login algorithm shown in FIG. 7, discussed below, the new user can choose to continue logging in irrespective of any conflicts presented. In an alternative embodiment, the new user is prohibited from continuing to log in if any conflict is presented (or a predetermined type or number of conflicts is/are presented). The new user may also be presented with an option of deferring login until a "conflict-free" time that is suggested by the management system (e.g., the management system may allow the new user to reserve a login time that is "conflict-free" from among one or more such times suggested by the management system).

If the new user chooses to continue to log in, she/he is preferably requested to input an end-time. Entry of this end-time is preferably optional for the new user. If the new user chooses to input an end-time, it is displayed in turn to all subsequent users that log into any part of the computer system that could cause conflict. This allows for better planning.

In accordance with the preferred embodiments of the present invention, the management system only flags users that can have actual conflicts. If there are users on the computer system that cannot have conflicts with the new user, their presence on the computer system will not be flagged.

One significant advantage of the present invention is its ease of use. A management system in accordance with the preferred embodiments of the present invention will have an easy-to-use login algorithm to determine if a user logging into a computer system through a certain interface has the potential to have a conflict with another user already logged into the computer system. This will reduce complexity for the user. The user does not need to worry about understanding the details of what another user may be doing on the computer system and can instead rely on the login algorithm of the management system.

A computer system implementation of the preferred embodiments of the present invention will now be described with reference to FIG. 1 in the context of a particular multi-user computer system 100, i.e., an IBM Power System computer system. However, those skilled in the art will appreciate that the method, apparatus, and computer program product of the present invention apply equally to any computer system, regardless of whether the computer system is a complicated multi-user computing apparatus (e.g., an IBM POWER6 processor-based server system or an IBM POWER6 processor-based blade system residing in an IBM BladeCenter chassis), a PC, or an embedded control system. As shown in FIG. 1, computer system 100 comprises one or more processors 101A, 101B, 101C and 101D, a main memory 102, a mass storage interface 104, a display interface 106, a network interface 108, and an I/O device interface 109. These system components are interconnected through the use of a system bus 110.

Figure 1:
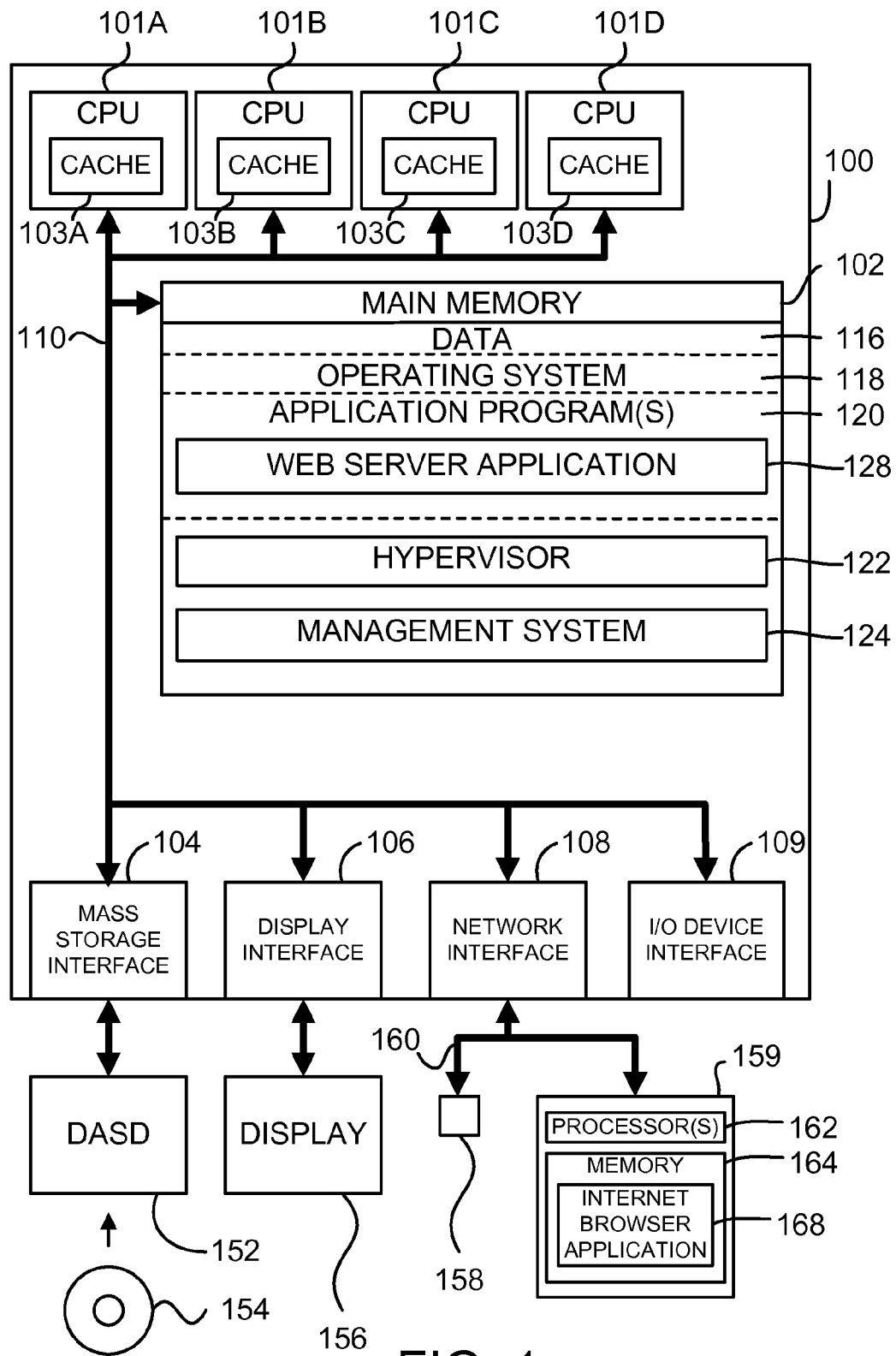
FIG. 1 is a block diagram illustrating a computer apparatus for implementing a mechanism for managing resources assigned to one or more logical partitions and/or one or more appliance partitions in a multi-user computer system in accordance with the preferred embodiments of the present invention.

A hypervisor 122, described further below, is shown in FIG. 1 residing in the main memory 102 and performs a number of multipartitioning functions and services for a plurality of partitions in the computer system 100. Typically, the hypervisor 122 comprises computer executable instructions maintained, for example, as a computer program product stored on a hard disk (e.g., on a DASD device 152) or system firmware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (nonvolatile RAM).

In accordance with the preferred embodiments of the present invention, a management system 124, described further below, resides in the main memory 102 (at least in the embodiment shown in FIG. 1) and is a component of, or operates in conjunction with, the hypervisor 122 for managing resources assigned to one or more logical partitions and/or one or more appliance partitions in the computer system 100. One skilled in the art will appreciate, however, that the management system 124 need not reside in the main memory 102 of the computer system 100. For example, the management system 124 may comprise computer executable instructions maintained, for example, as a computer program product stored on a hard disk (e.g., on a DASD device 152) or system firmware.

Most complex computer systems such as servers have some form of a hypervisor that virtualizes physical hardware for the various partitions and can control access to various parts of the computer system based on the configuration specified during system setup. This configuration can be modified later through different methods/interfaces. The different interfaces such as hardware management consoles communicate with the hypervisor in order to perform any actions. Applications running on a partition will be granted authentication (to the hardware) by the hypervisor via the partition. As a result, the hypervisor is the perfect layer to use for a management system in accordance with the preferred embodiments of the present invention.

A service interface is one that has service authority and can access/manipulate all the hardware on the computer system. An example would be a hardware management console. A non-service interface, on the other hand, is one that has some level of control with respect to certain parts of the hardware controlled through the hypervisor. An example of a non-service interface would be a client partition that owns an Ethernet card. The hypervisor has the configuration information to figure out which client partitions (and/or VIOS partitions, if any) own which hardware in part or completely and thus can be used in an algorithm to figure out if a given client when logged in has the potential for a conflict with another client already logged in through a different interface.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Processors 101A, 101B, 101C and 101D (also collectively referred to herein as "processors 101") process instructions and data from main memory 102. Processors 101 temporarily hold instructions and data in a cache structure for more rapid access. In the embodiment shown in FIG. 1, the cache structure comprises caches 103A, 103B, 103C and 103D (also collectively referred to herein as "caches 103") each associated with a respective one of processors 101A, 101B, 101C and 101D. For example, each of the caches 103 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Main memory 102 in accordance with the preferred embodiments contains data 116, an operating system 118 and application software (e.g., one or more application programs 120 such as a web server application 128), utilities and other types of software. In addition, main memory 102 includes the hypervisor 122 and the management system 124, each of which may in various embodiments exist in any number. (One skilled in the art will appreciate that the hypervisor 122 and/or the management system 124 need not reside in the main memory 102 of the computer system 100.) Each of these entities in memory is described further below.

Although the hypervisor 122 and the management system 124 are illustrated as being contained within the main memory 102, in other embodiments some or all of them may be on different electronic devices and may be accessed remotely (e.g., via a network 160). Thus, for example, the management system 124 may be at least partially located or implemented on a networked device (e.g., a computer system, such as a workstation 158 and/or a client system 159), while the hypervisor 122 resides on the computer system 100.

The preferred embodiments expressly extend to the management system 124 being at least partially implemented in a hardware management console (e.g., the hardware management console 620 shown in FIG. 6) within the scope of the preferred embodiments. As described further below, a hardware management console is typically coupled to one or more servers over a service network.

In accordance with the preferred embodiments of the present invention, the computer system 100 may be a server system connected to a client system 159 across a network 160. The client system 159 (if present) includes one or more processors 162 and a memory 164. The memory 164 has stored therein, at least at various times, an internet browser application 168 providing the client system 159 the ability to remotely access data, applications and other types of software (e.g., the hypervisor 122 and/or the management system 124) located on the server 100. For example, the internet browser application 168 (e.g., HTTP-based, HTTPS-based, etc.) may transfer files and data via the web server application 128 of the server 100. The user, once the hypervisor 122 and/or the management system 124 is/are accessed, can remotely input the login information. The internet browser application 168 of the client system 159 may then transfer the remotely input login information to the server 100. One skilled in the art will appreciate, however, that utilization of an internet browser application is merely exemplary. Suitable alternatives include green screen, VNC (virtual network computing), etc.

The web server application 128 may include any suitable web server programming that enables access and data exchange with the client system 159. For example, the web server application 128 may supply software code associated with the hypervisor 122 and/or the management system 124 to the client system 159 in the form of an applet, plug-in, or the like for viewing and/or interaction by the user at the client system 159. Additionally, while the above exemplary embodiment of the present invention describes the client system 159 as including the internet browser application 168 and the server 100 as including the web server application 128, one skilled in the art would recognize that any type of monolithic application could be employed, using suitable protocols, at both the server 100 and the client system 159, that would enable the user to remotely input login information.

The hypervisor 122 represents any partition management code that is responsible for performing multipartitioning functions and services for partitions in the computer system 100. The hypervisor 122 may be, for example, a PowerHypervisor, which is available from International Business Machines Corporation.

While the hypervisor 122 is shown in FIG. 1 as a separate entity in memory, the preferred embodiments expressly extend to the hypervisor 122 being implemented within the operating system 118, application software, utilities, or other types of software within the scope of the preferred embodiments. For example, the hypervisor 122 may be a layer of the operating system 118 responsible for performing multipartitioning functions.

The hypervisor 122 may comprise system firmware or computer executable instructions maintained, for example, as a computer program product stored on a hard disk (e.g., on a DASD device 152).

In another embodiment, the hypervisor 122 may be implemented in hardware via logic gates and/or other appropriate hardware techniques in lieu of, or in addition to, a processor-based system.

In the preferred embodiments of the present invention, the management system 124 includes instructions capable of executing on the processors 101 or statements capable of being interpreted by instructions executing on the processors 101 to perform the functions as further described below with reference to FIG. 7. Also in accordance with the preferred embodiments of the present invention, the management system 124 may include instructions capable of executing on processor(s) of a networked device or statements capable of being interpreted by instructions executing on such processor(s) of the networked device to perform the functions as further described below with reference to FIG. 7. For example, the management system 124 may include instructions that execute on the processor(s) 162 of the client system 159 (shown in FIG. 1) or the processor(s) 616 of the hardware management console 618 (shown in FIG. 6).

While the management system 124 is shown in FIG. 1 as a separate entity in memory, the preferred embodiments expressly extend to the management system 124 being implemented within the hypervisor 122, application software, utilities, or other types of software within the scope of the preferred embodiments. For example, the management system 124 may be a component of the hypervisor 122.

The management system 124 may comprise system firmware or computer executable instructions maintained, for example, as a computer program product stored on a hard disk (e.g., on a DASD device 152).

In another embodiment, the management system 124 may be implemented in hardware via logic gates and/or other appropriate hardware techniques in lieu of, or in addition to, a processor-based system.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, application program(s) 120, hypervisor 122, management system 124, and web server application 128, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100.

Operating system 118 is a multitasking operating system known in the industry as IBM i (formerly IBM i5/OS); however, those skilled in the art will appreciate that the spirit and scope of the present invention is not limited to any one operating system. There are many suitable multitasking operating systems, such as AIX, Linux, etc. The operating system 118, which is located in a single partition, is preferably designed to interface with open firmware, such as partition management firmware (e.g., the hypervisor).

Processors 101 may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

Although computer system 100 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load I/O related processing from processors 101. However, those skilled in the art will appreciate that the present invention applies equally to computer systems that simply use I/O adapters to perform similar functions.

Mass storage interface 104 is used to connect one or more mass storage devices 152 (such as a direct access storage device (DASD), CD-ROM drive, DVD-ROM drive, CD-RW drive, and the like) to computer system 100. One specific type of mass storage device is a CD-ROM drive, which may read data from a CD-ROM 154. Another specific type of mass storage device is a readable and writable CD-RW drive, which may write data to and read data from a CD-RW.

Display interface 106 is used to directly connect one or more displays 156 to computer system 100. These displays 156, which may be non-intelligent (i.e., dumb) terminals or fully programmable workstations, are used to allow system administrators and other users to communicate with computer system 100. Note, however, that while display interface 106 is provided to support communication with one or more displays 156, computer system 100 does not necessarily require a display 156, because all needed interaction with users and processes may occur via network interface 108.

Network interface 108 is used to connect other computer systems (such as the workstations 158 and/or the client systems 159) to computer system 100 across a network 160. In accordance with the preferred embodiments of the present invention, these networked computer systems, like the client system 159, may include a computer system on which a web browser program resides by which the hypervisor 122 and/or the management system 124 may be accessed.

Figure 6:
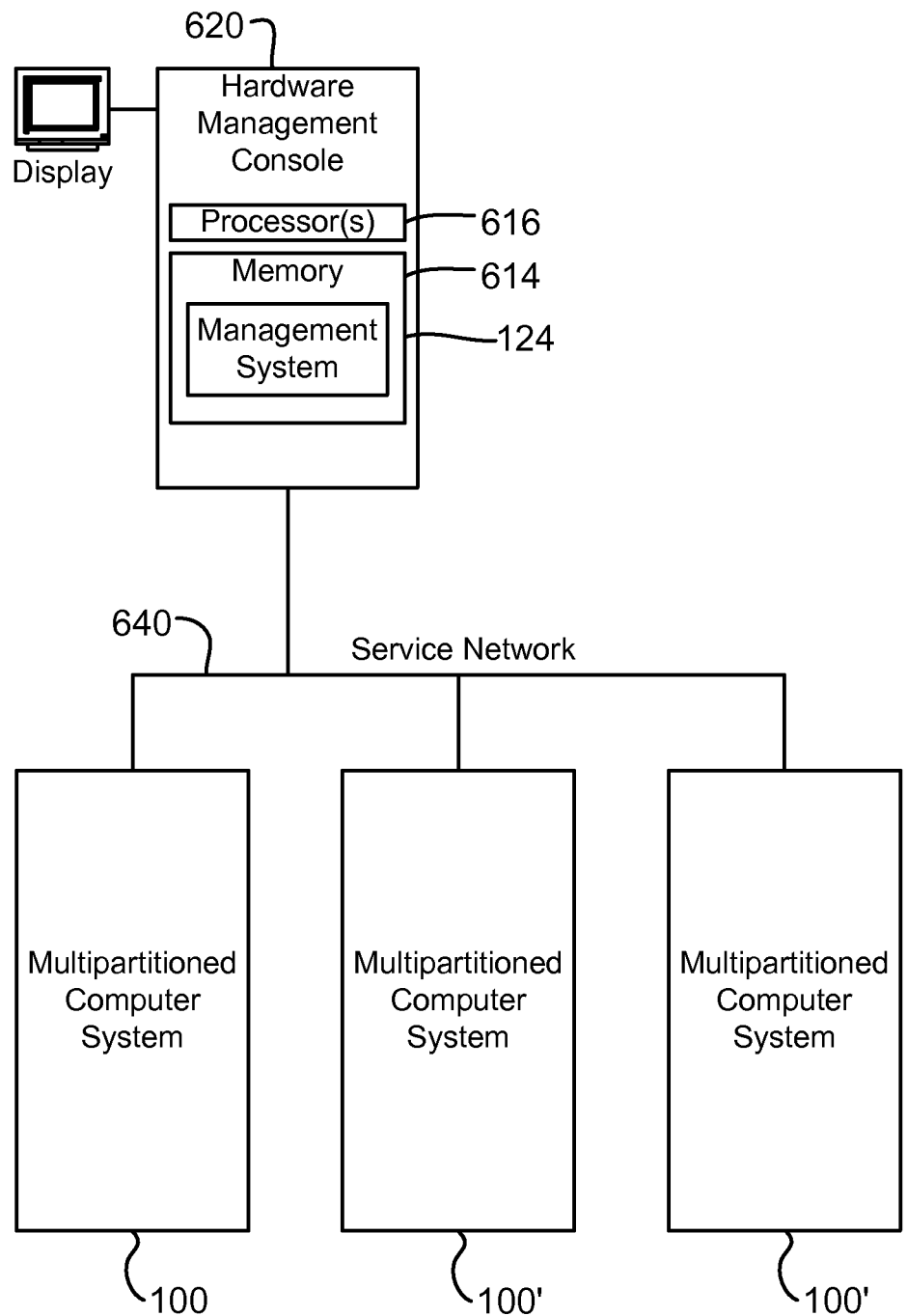
FIG. 6 is a block diagram illustrating a computer apparatus for implementing a mechanism for managing resources assigned to one or more logical partitions and/or one or more appliance partitions in each of one or more computer systems in accordance with the preferred embodiments of the present invention, wherein the computer systems are managed by a hardware management console (HMC).

Also, in accordance with the preferred embodiments of the present invention, these networked computer systems may include a computer system on which a hardware management console (HMC) resides. In such HMC-managed systems, as shown in FIG. 6, the management system 124 may be at least partially integrated into, or operate in conjunction with, the hardware management console.

The present invention applies equally no matter how computer system 100 may be connected to other computer systems (such as the workstations 158 and/or the client systems 159), regardless of whether the network connection 160 is made using present-day analog and/or digital techniques or via some networking mechanism of the future. In addition, many different network protocols can be used to implement network 160. These protocols are specialized computer programs that allow computers to communicate across network 160. TCP/IP (Transmission Control Protocol/Internet Protocol) is an example of a suitable network protocol.

The I/O device interface 109 provides an interface to any of various input/output devices.

At this point, it is important to note that while the description above is in the context of a fully functional computer system, those skilled in the art will appreciate that the management system 124, as well as the other software type entities described herein may be distributed as an article of manufacture (also referred to herein as a "computer program product") in a variety of forms, and the claims extend to all suitable types of computer-readable media used to actually carry out the distribution, including recordable type media such as floppy disks and CD-RWs, CD-ROMs (e.g., CD-ROM 154) and DVD-ROMs.

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

Operations of the different partitions in the computer system 100 may be controlled through a hardware management console (HMC), such as the hardware management console 620 (shown in FIG. 6). In the embodiment shown in FIG. 6, the hardware management console 620 is a separate computer system from which a system administrator, for example, may perform various functions including creating one or more logical partitions, assignment of hardware resources to each logical partition, as well as reassignment of resources to different partitions. IBM POWER6 processor-based systems, for example, can be managed by an HMC. Note that the term hardware management console (HMC) is used herein in a very broad sense to include any system and logical partition management utility that may be used to manage a logically partitioned computer system. Thus, as used herein the term HMC refers to any administrative console that communicates with firmware via APIs (application programming interfaces). In other embodiments, a hardware management console may be installed directly on the system being managed (e.g., IBM's Integrated Virtualization Manager, VMWare Server).

As noted above, in addition to the management system 124 residing in the main memory 102 of the computer system 100 (as shown in FIG. 1), the management system 124 may reside, at least partially, in a memory and be executed by one or more processors of the HMC 620 (as described further below with reference to FIG. 6).

For example, in the HMC-managed embodiment shown in FIG. 6, the management system 124 resides, at least partially, in a memory 614 and is executed by one or more processors 616 of a computer system that comprises the hardware management console 620. The HMC 620 is connected to the multi-user computer system 100 (and to the other multi-user computer systems 100') by a service network 640.

In a modification of the above-described HMC-managed embodiment, the management system 124 may reside, at least partially, in memory and be executed by processor(s) of one or more additional computer systems (not shown) connected indirectly to the multi-user computer system 100 (and to the other multi-user computer systems 100') through the HMC 620 (or other administrative console). For example, the management system 124 may run within IBM Systems Director, which typically resides on a computer system networked to the HMC 620. IBM Systems Director is an integrated suite of tools that provides a platform management foundation for managing physical and virtual systems across a multi-system environment.

Figure 7:
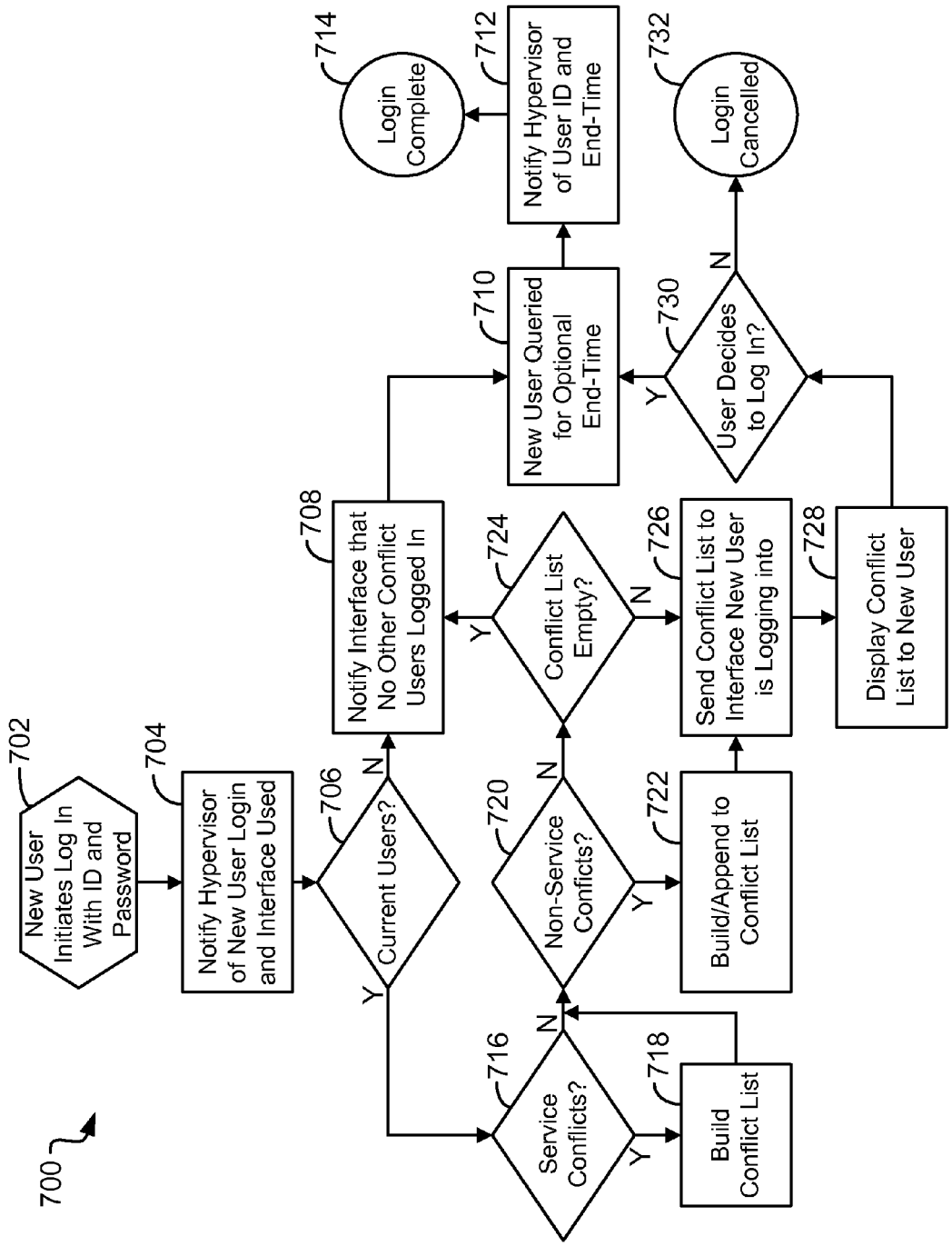
FIG. 7 is a flow diagram illustrating a method for managing resources assigned to one or more logical partitions and/or one or more appliance partitions in a multi-user computer system through a login algorithm in accordance with the preferred embodiments of the present invention.

FIG. 7 is a flow diagram illustrating a method 700 for managing resources assigned to one or more logical partitions and/or one or more appliance partitions in a multi-user computer system through a login algorithm. In the method 700, the steps discussed below (steps 702-732) are performed. These steps are set forth in their preferred order. It must be understood, however, that the various steps may occur at different times relative to one another than shown, or may occur simultaneously. Moreover, those skilled in the art will appreciate that one or more of the steps may be omitted.

Method 700 begins when a new user initiates logging into a server (or other computer system) through a client interface by entering a User ID and a password (step 702). For example, temporarily referring to FIG. 1, the new user may be logging into the computer system 100 through the client system 159. One skilled in the art will appreciate, however, that the new user may initiate logging into the server (or other computer system) though any type of interface. For example, the new user may initiate logging into the server though a service interface, such as a hardware management console. Also, one skilled in the art will appreciate that other types of user information (e.g., biometric information) may be used by the user to initiate logging into the server in lieu of, or in addition to, entering a User ID and a password.

An event is created on the client interface and sent to the hypervisor including interface information about the client interface being logged into and user information such as the User ID (step 704). The interface/user information sent to the hypervisor is referred to herein as "login information". The management system, which is running in the hypervisor (at least in this example), receives this event and then checks to see if there are any other users currently logged into any of the possible client interfaces on the server (step 706). Information about users currently logged into the various client interfaces available on the server, both service interfaces and non-service interfaces, is preferably stored in a list called a "surveillance list". The surveillance list may be built and maintained by the hypervisor and/or the management system. An illustrative example of such a surveillance list (856 in FIG. 10) is described below in Example 1.

If the management system determines that there is no one else logged in (i.e., the surveillance list is empty) (step 706=No), the client interface being logged into is informed that there are no conflicts that exist at that point (step 708). The new user is then requested to enter an end-time to indicate when she/he will be finished using the client interface (step 710). Input of this end-time by the new user is optional, but the new user is informed that entry of the end-time will help subsequent users logging into client interfaces plan system time accordingly, if conflicts are detected. The end-time, if the new user chooses to enter one, is added to the surveillance list along with the new user's login information (step 712). Login is now complete (step 714).

One skilled in the art will appreciate, that the new user's login information (i.e., the interface/user information) may be added to the surveillance list any time after this information is received in step 704.

If the management system detects that the surveillance list is not empty (step 706=Yes), the management system goes through the surveillance list to determine if there are any users logged into service interfaces (step 716). Preferably, any service interface in the surveillance list is identified as such directly within the surveillance list. For example, in the exemplary surveillance list shown in FIG. 10, the "Interface ID" column identifies the first interface as a service interface (i.e., a hardware management console "HMC1"). In an alternative embodiment, the management system may additionally check the configuration information stored in the hypervisor to determine whether or not each interface listed in the surveillance list is a service interface. If there are any users logged into service interfaces (step 716=Yes), the management system will add those users into a list of users that could cause potential conflicts with the new user (step 718). This list, which is built by the management system either in step 718 or step 722 (discussed below), is called a "conflict list".

After completing step 718, or if the management system determines there are no users logged into service interfaces (step 716=No), the management system then checks the surveillance list for any non-service interfaces that are logged into and checks the configuration information stored in the hypervisor (this configuration information is typically stored in a table known as a "LPAR configuration table", such as 854 in FIG. 9) to see if the client interfaces currently logged into share ownership of any hardware with the client interface being logged into by the new user (step 720). If there are any users currently logged into client interfaces that share ownership with the client interface being logged into by the new user (step 720=Yes), the management system will add those users to the conflict list (step 722).

On the other hand, if there are no users currently logged into client interfaces that share ownership with the client interface being logged into by the new user (step 720=No), the management system determines if the conflict list is empty (step 724). If the management system determines that the conflict list is empty (step 724=Yes), the method goes to step 708 (described above).

After completing step 722, or if the management system determines that the conflict list is not empty (step 724=No), the management system sends the conflict list to the client interface logged into by the new user (step 726). The conflict list is then presented to the new user (step 728). For example, temporarily referring to FIG. 1, the conflict list may be displayed to the new user on a screen of the client system 159.

In accordance with the preferred embodiments of the present invention, the new user can decide to continue logging in despite the conflicts or decide to log in at a later time. To accomplish this, the method 700 continues with the management system determining whether the new user decides to continue logging in (step 730). If the new user decides to continue logging in (step 730=Yes), the method goes to step 710 (described above). On the other hand, if the new user decides not to log in, the login may then be cancelled (step 732). Preferably, step 732 cancels the login after giving the new user a chance to make a future calendar entry (i.e., a reservation) based on available "conflict-free" times during which no conflict exists.

One skilled in the art will appreciate that the method 700 may be tweaked based on the desired outcomes. For example, the new user login could simply be rejected if a conflict exists.

In addition, the management system may implement various processes to handle various other situations that may arise, such as when the new user is tardy in logging off. These processes may be tweaked based on the desired behavior. For example, the new user could be automatically kicked off from the client interface when the management system detects that the end-time entered while logging in has been reached. Alternatively, the management system could provide a warning (i.e., that the end-time entered while logging in has been reached) to the new user along with the most up-to-date conflict list and let the new user continue to remain logged in irrespective of whether other users are logged in. At the same time, the other users could get a notification warning them of this change in the conflict list. If there are no conflicts, the new user could be allowed to extend the end-time. This, in turn, would cause the management system to update the surveillance list with the new end-time.

There are certain interfaces, such as the hardware management console (HMC), through which multiple computer systems can be managed. Such interfaces usually have a single user name and password that allow access to all the computer systems being managed by the interface. Such interfaces would require special handling by the management system. In one embodiment, the HMC would send login information to the hypervisor of each computer system being managed by the HMC as the new user logs into the interface. This would happen in steps 702 and 704 (described above) of the method 700. In some cases, this may be disadvantageous because the HMC would be added to each system's surveillance list (perhaps unnecessarily). In another embodiment, a portion of the management system residing in the HMC would query the hypervisor of a particular one of the computer systems being managed by the HMC each time a disruptive system specific action is requested of that computer system from the interface. That system's hypervisor would then return its conflict list, if any, to the HMC. The user at the HMC could then proceed with the request or choose to create an entry (i.e., reservation) for a later time to attempt the request then.

Examples 1 and 2 are provided below for the purpose of helping the reader to understand of the present invention. These examples are illustrative and not intended to limit the scope of the present invention.

EXAMPLE 1

Figure 8:
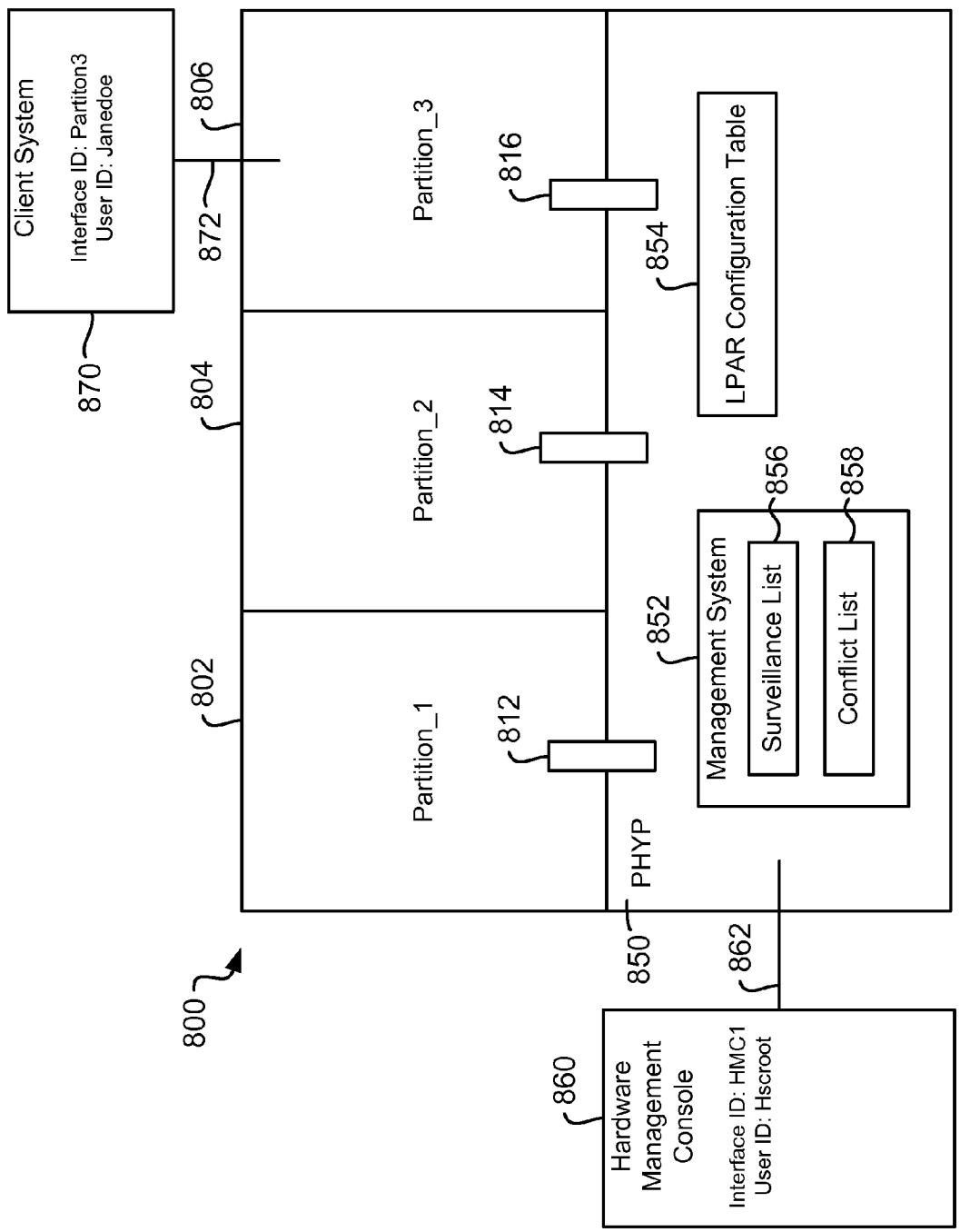
FIG. 8 is a block diagram illustrating a multipartitioned computer system in accordance with the preferred embodiments of the present invention. The multipartitioned computer system in FIG. 8 corresponds to Example 1.

FIG. 8 is a block diagram illustrating a multipartitioned computer system 800 utilized in Example 1. The computer system 800 may be, for example, an IBM Power Systems server. In this example, the computer system 800 includes three logical partitions 802, 804 and 806, as well as a hypervisor 850. The logical partitions 802, 804 and 806 are also denoted in FIG. 8 as "Partition_1", "Partition_2" and "Partition_3", respectively. The hypervisor 850 may be, for example, a PowerHypervisor (PHYP) available from International Business Machines Corporation. Consequently, the hypervisor 850 is also denoted in FIG. 8 as "PHYP". As is conventional, an internal, secure communication channel 812, 814 and 816 is provided between the hypervisor 850 and each of the logical partitions 802, 804 and 806, respectively.

In accordance with the preferred embodiments of the present invention, a management system 852 runs in the hypervisor 850. As is conventional, the hypervisor 850 maintains a LPAR configuration table 854. In accordance with the preferred embodiments of the present invention, the management system 852 maintains a surveillance list 856 and a conflict list 858. The information stored by the firmware in the LPAR configuration table 854, the surveillance list 856 and the conflict list 858 may reside anywhere in the computer system 800.

Initially in this first example, a user with the User ID "Hscroot" logs on to a hardware management console (HMC) 860, which manages computer system 800, at 5:00 am on Nov. 13, 2009. As is conventional, an Ethernet communication channel 862 is provided between the HMC 860 and the hypervisor 850 on the computer system 800. The HMC 860 informs the hypervisor 850 that a user Hscroot has logged in. The management system 852, which is running in the hypervisor 850, then checks its surveillance table 856 to see if anyone else is logged in. Assume, for purposes of this example, that the management system 852 finds the surveillance table 856 is empty. Accordingly, the management system 852 notifies the HMC 860 that no one else is currently scheduled on the computer system 800. The management system 852 then prompts the user Hscroot to specify if she/he will be working on the computer system 800, and if so, to enter an estimated end-time for when she/he will be done working on the computer system 800. In response, the user Hscroot enters information into the HMC 860 indicating that she/he will be done working on the computer system 800 seven hours from now (i.e., 12:00 pm on Nov. 13, 2009), and provides a description of the work she/he will be performing along with a phone number for who to contact with any questions. The HMC 860 then notifies the management system 852 of the user Hscroot's planned end-time, description of the work, and contact information. The management system 852 then enters a reservation for the user Hscroot into the surveillance list 856.

Subsequently in this first example, at 8:00 am that same day (Nov. 13, 2009), a different user with the User ID "Janedoe" logs onto the logical partition 806 (Partition_3) of the computer system 800 through a client system 870. As is conventional, an Ethernet communication channel 872 or other communication network is provided between the client system 870 and the logical partition 806 (Partition_3) on the computer system 800. The partition 806 (Partition_3) informs the hypervisor 850 that a user Janedoe has logged in. The management system 852, which is running in the hypervisor 850, then checks its surveillance table 856 to see if anyone else is currently logged in to any partitions on the system or management utilities connected to the system, and sees the reservation for the user Hscroot three hours ago. Then, the management system 852 determines this reservation, due to it being made for the HMC 860 (which can be used to disrupt the partition's activities), could conflict with the new user Janedoe. Consequently, the management system 852 builds a conflict list 858 containing an entry corresponding to the user Hscroot. This is the state of the conflict list 858 shown in FIG. 11.

The management system 852 also sends the conflict list 858 to the partition 806 (Partition_3) via the hypervisor 850 using the communication channel 816. Then, the partition 806 (Partition_3) sends the conflict list 858 to the client system 870 for display to the user Janedoe. The user Janedoe reads the description of the conflicting schedule, realizes the work being performed on the HMC 860 will not affect the partition 806 (Partition_3) at all, and chooses to ignore the conflict. The management system 852 then prompts the user Janedoe to enter an estimated end-time for when she will be done working on the computer system 800. In response, the user Janedoe enters information into the client system 870 indicating that she will be done working on the computer system 800 nine hours from now (i.e., 5:00 pm on Nov. 13, 2009) and provides a description of the work she will be performing. The client system 870 then notifies the partition 806 (Partition_3), which in turn notifies the management system 852 (via the hypervisor 850 using communication channel 816) of the user Janedoe's planned end-time and description of the work. The management system 852 then enters a reservation for the user Janedoe into the surveillance list 856. This is the state of the surveillance list 856 shown in FIG. 10

Figure 9:
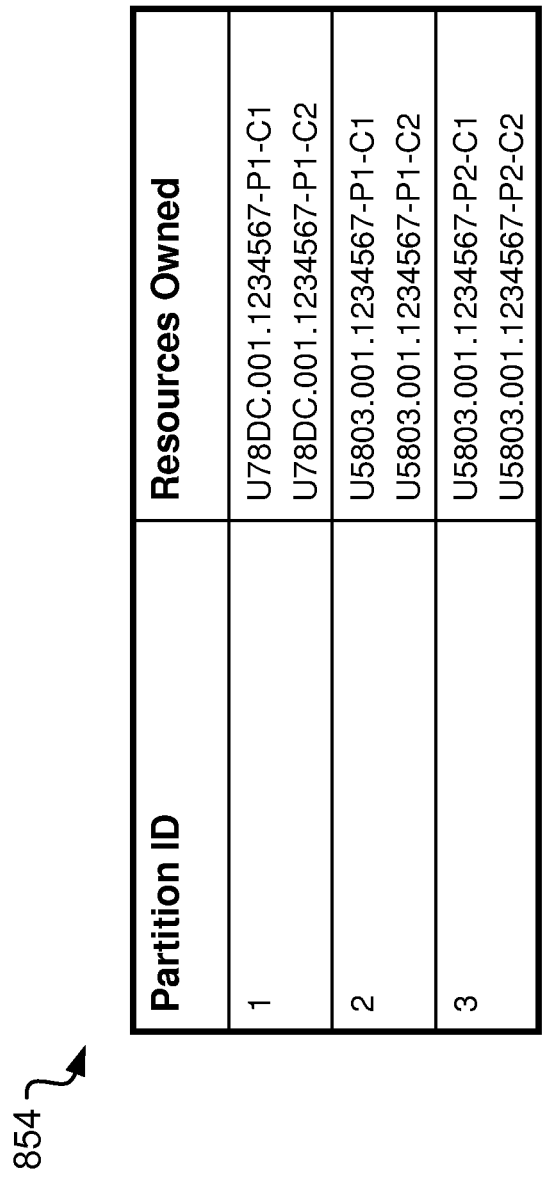
FIG. 9 is a diagram illustrating an exemplary data structure for the LPAR configuration table in FIG. 8. The LPAR configuration table in FIG. 9 is discussed in Example 1.

FIG. 9 is a diagram illustrating an exemplary data structure for the LPAR configuration table 854. The LPAR configuration table 854 includes a "Partition ID" column and a "Resources Owned" column. For each of partitions, the LPAR configuration table 854 identifies the resources owned. For example, "Partition_1" owns resources "U78DC.001.1234567-P1-C1" and "U78DC.001.01234567-P1-C2". In accordance with the preferred embodiments of the present intention, the management system may utilize such an LPAR configuration table to determine whether any partitions currently logged into share ownership of any resources with the partition being logged into by the new user.

FIG. 10 is a diagram illustrating an exemplary data structure of the surveillance list 856. The surveillance list 856 includes an "Interface ID" column, a "User ID string" column, a "Start time" column, an "End time" column, and an "Optional Descriptive string" column. The surveillance list 856 includes an entry (row of information) corresponding to each of the interfaces currently logged into.

FIG. 11 is a diagram illustrating an exemplary data structure of the conflict list 858. The conflict list 858 includes an "Interface ID" column, a "User ID string" column, a "Start time" column, an "End time" column, and an "Optional Descriptive string" column. The conflict list 858 includes an entry (row of information) corresponding to each of the interfaces currently logged into that potentially conflict with the interface being logged into by a new user. The conflict list 858 may be dynamic, and is not necessarily stored for future reference (unlike the surveillance list 856).

EXAMPLE 2

In this example, multiple VIOS partitions are being used to virtualize Ethernet/storage adapters for client partitions on a server. A System Administrator is performing an upgrade on a VIOS partition (VIOS_partition_id_2), which has ten (10) Ethernet cards virtualized across forty (40) client partitions. One of the Ethernet cards (Ethernet_card_C) in the VIOS_partition_id_2 needs to be upgraded as a result of the performance improvements that the new card will provide to the client partitions. This Ethernet card is serving seven (7) client partitions (partition_id_5, partition_id_15, partition_id_28, partition_id_69, partition_id_81, partition_id_84 and partition_id_85).

This is a fairly involved example, as there are seven (7) client partitions each with potentially multiple users all of whom need to be involved with the coordination of the upgrade. One mistake could cause a lot of issues for a single or multiple users if the upgrade is performed when critical partition workloads are running on the hardware. It is common practice for partition users to plan for different kinds of outages that occur when normal maintenance is performed for partitions. While such an outage is probably documented for the partition users, it is hard for the System Administrator to know about all of these users and to free timing windows on a system that can have upwards of one hundred (100) partitions.

Initially in this second example, a partition administrator logs into partion_id_5 and signs up to have the partition booked for the next three months serving the payroll needs for her/his company. At the end of the three months, all payroll services will start being handled by a different partition so that this partition can be disruptively upgraded. The partition_id_5 has no subsequent entries for after the upgrade (such entries will be created after the upgrade is completed).

Subsequently in this second example, the System Administrator logs into the VIOS_partition_id_2 two months later (i.e., two months after the partition administrator logs into partition_id_5 and signs up to have the partition booked for the next three months). The management system queries the firmware for conflicting calendar information for this VIOS partition. That is, the management system checks the surveillance list for conflicting calendar entries (i.e., Start time-End time) of client partitions that use virtual devices associated with the hardware owned by this VIOS partition. The management system checks the firmware's partition configuration tables to determine which pieces of the hardware are owned by this VIOS partition. For all client partitions that show ownership of this hardware (as a result of using a virtual device associated with this hardware) managed by this VIOS partition in the firmware's partition configuration tables, conflicting calendar entries that exist in the surveillance list are collected in a conflict list and returned to the System Administrator logging into this VIOS partition. Parition_id_5 is one such partition the management system finds.

The System Administrator now knows that partition_id_5 is being utilized for another month and has similar information about all other partitions affected by the upgrade, along with contact information for users who have booked the partitions. Using this data, the System Administrator knows if there is a timeframe when the Ethernet card is not being utilized by any of the seven partitions the Ethernet card serves. If there is no timeframe available, the System Administrator can contact all the users of the partitions whose contact information were provided by the management system and coordinate a timeframe that works for them. If there is a timeframe available, the System Administrator may sign up for (reserve) the VIOS partition for that timeframe. If anyone tries to log in to one of the client partitions during this reserved timeframe, the management system will detect that a service partition owning that hardware used by the client partition has a reservation entry and warn the user that she/he may suffer outages during that timeframe.

In accordance with the preferred embodiments of the present invention, anyone using any partition on the system is automatically prompted for calendaring information (e.g., end-time, description of the work, and/or contact info) upon login. Hence, the calendaring information in the management system is likely to be accurate. Problems arise in the prior art when the user has to go to a separate calendar system and sign up for partition/system time. In the prior art, if the user chooses not to use the calendar in conventional management systems, data may be inaccurate. In conventional management systems, the users may even have different calendar systems for different parts of the server (instead of a unified calendar system). The System Administrator may not know about or forget to look at these disparate calendar systems.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A computer system, comprising:
at least one processor;
a memory coupled to the at least one processor;
a hypervisor executed by one or more of the at least one processor, wherein the hypervisor assigns computer resources of the computer system to at least one of one or more logical partitions and one or more appliance partitions, and wherein the hypervisor controls access to the computer resources;
a management system executed by one or more of the at least one processor,
wherein the management system receives login information from a new user who is logging into the computer system through a first interface, wherein, upon being logged into the computer system, the new user will have access to a logical partition to which is assigned at least one shared resource or to which is assigned a logical device associated with at least one shared resource, and wherein each shared resource is one of the computer resources,
wherein the management system builds a conflict list of one or more users, each who is currently logged into the computer system though a respective interface and having access to a respective logical partition to which is assigned one or more of the at least one shared resource or to which is assigned a logical device associated with one or more of the at least one shared resource, wherein each of the one or more of the at least one shared resource presents a possibility of conflict between a respective user currently logged into the computer system and the new user as a result of shared ownership of that shared resource, wherein the management system builds the conflict list by:
checking if any user is currently logged into the computer system through a service interface, and adding an entry to the conflict list for each user currently logged into the computer system through a corresponding service interface; and
checking if any user is currently logged into the computer system through a non-service interface, checking to determine, for each user currently logged into the computer system through a corresponding non-service interface, if that user has access to a respective logical partition to which is assigned one or more of the at least one shared resource or to which is assigned a logical device associated with one or more of the at least one shared resource, and adding an entry to the conflict list for each user currently logged into the computer system through the corresponding non-service interface and having said access, and
wherein the management system sends the conflict list for presentation to the new user.

2. The computer system as recited in claim 1, wherein at least one of the hypervisor and the management system builds a surveillance list in which is stored information about one or more users currently logged into the computer system, wherein the information stored in the surveillance list includes, for each user currently logged into the computer system, an Interface ID that identifies whether that user is logged into the computer system through a service interface or a non-service interface.

3. The computer system as recited in claim 2, wherein at least one of the hypervisor and the management system checks the surveillance list when the new user is logging into the computer system to determine if a given user currently logged into the computer system has access to a respective logical partition to which is assigned or with which is associated one of the computer resources that presents a possibility of conflict with actions of the new user.

4. The computer system as recited in claim 1, wherein the management system requests the new user to enter an end-time indicating a time before or at which the new user anticipates logging off the computer system.

5. The computer system as recited in claim 1, wherein the management system runs at least partially in the hypervisor.

6. The computer system as recited in claim 1, wherein each shared resource is physical hardware assigned to the appliance partition, wherein the one or more appliance partitions comprise a virtual I/O server (VIOS) partition, wherein the one or more logical partitions are assigned virtualized devices associated with the physical hardware, and wherein the one or more logical partitions do not have direct access to the physical hardware.

7. The computer system as recited in claim 1, wherein the first interface of the new user is either a service interface type or a non-service interface type, and wherein each respective interface of the currently logged-in users is either the service interface type or the non-service interface type.

8. The computer system as recited in claim 7, wherein the first interface of the new user is one of either the service interface type comprising a hardware management console (HMC) or the non-service interface type, and wherein the respective interface of at least one of the currently logged-in users is the other of either the service interface type comprising the hardware management console (HMC) or the non-service interface type.

9. The computer system as recited in claim 7, wherein the first interface of the new user is a given one of either the service interface type or the non-service interface type, and wherein the respective interface of at least one of the currently logged-in users is the same given one of either the service interface type or the non-service interface type.

10. A computer-implemented method of managing computer resources assigned by a hypervisor to at least one of one or more logical partitions and one or more appliance partitions in a multi-user computer system, comprising the steps of:
receiving login information from a new user who is logging into the computer system through a first interface, wherein, upon being logged into the computer system, the new user will have access to a logical partition to which is assigned at least one shared resource or to which is assigned a logical device associated with at least one shared resource, and wherein each shared resource is one of the computer resources,
building a conflict list of one or more users, each who is currently logged into the computer system though a respective interface and having access to a respective logical partition to which is assigned one or more of the at least one shared resource or to which is assigned a logical device associated with one or more of the at least one shared resource, wherein each of the one or more of the at least one shared resource presents a possibility of conflict between a respective user currently logged into the computer system and the new user as a result of shared ownership of that shared resource, wherein the management system builds the conflict list by:
checking if any user is currently logged into the computer system through a service interface, and adding an entry to the conflict list for each user currently logged into the computer system through a corresponding service interface; and
checking if any user is currently logged into the computer system through a non-service interface, checking to determine, for each user currently logged into the computer system through a corresponding non-service interface, if that user has access to a respective logical partition to which is assigned one or more of the at least one shared resource or to which is assigned a logical device associated with one or more of the at least one shared resource, and adding an entry to the conflict list for each user currently logged into the computer system through the corresponding non-service interface and having said access, and
sending the conflict list for presentation to the new user.

11. The computer-implemented method as recited in claim 10, further comprising the step of:
building a surveillance list in which is stored information about one or more users currently logged into the computer system, wherein the information stored in the surveillance list includes, for each user currently logged into the computer system, an Interface ID that identifies whether that user is logged into the computer system through a service interface or a non-service interface.

12. The computer-implemented method as recited in claim 11, wherein the step of building a conflict list includes the step of:
checking the surveillance list when the new user is logging into the computer system to determine if a given user currently logged into the computer system has access to a respective logical partition to which is assigned or with which is associated one of the computer resources that presents a possibility of conflict with actions of the new user.

13. The computer-implemented method as recited in claim 10, further comprising the step of:
requesting the new user to enter an end-time indicating a time before or at which the new user anticipates logging off the computer system.

14. The computer-implemented method as recited in claim 10, wherein each shared resource is physical hardware assigned to the appliance partition, wherein the one or more appliance partitions comprise a virtual I/O server (VIOS) partition, wherein the one or more logical partitions are assigned virtualized devices associated with the physical hardware, and wherein the one or more logical partitions do not have direct access to the physical hardware.

15. The computer-implemented method as recited in claim 10, wherein the first interface of the new user is either a service interface type or a non-service interface type, and wherein each respective interface of the currently logged-in users is either the service interface type or the non-service interface type.

16. The computer-implemented method as recited in claim 15, wherein the first interface of the new user is one of either the service interface type comprising a hardware management console (HMC) or the non-service interface type, and wherein the respective interface of at least one of the currently logged-in users is the other of either the service interface type comprising the hardware management console (HMC) or the non-service interface type.

17. The computer-implemented method as recited in claim 15, wherein the first interface of the new user is a given one of either the service interface type or the non-service interface type, and wherein the respective interface of at least one of the currently logged-in users is the same given one of either the service interface type or the non-service interface type.

18. A computer program product for managing computer resources assigned by a hypervisor to at least one of one or more logical partitions and one or more appliance partitions in a multi-user computer system, comprising:
a plurality of executable instructions provided on a non-transitory computer-readable media comprising a recordable type media, wherein the executable instructions, when executed by at least one processor in a digital computing device, cause the digital computing device to perform the steps of:
receiving login information from a new user who is logging into the computer system through a first interface, wherein, upon being logged into the computer system, the new user will have access to a logical partition to which is assigned at least one shared resource or to which is assigned a logical device associated with at least one shared resource, and wherein each shared resource is one of the computer resources,
building a conflict list of one or more users, each who is currently logged into the computer system though a respective interface and having access to a respective logical partition to which is assigned one or more of the at least one shared resource or to which is assigned a logical device associated with one or more of the at least one shared resource, wherein each of the one or more of the at least one shared resource presents a possibility of conflict between a respective user currently logged into the computer system and the new user as a result of shared ownership of that shared resource, wherein the management system builds the conflict list by:
checking if any user is currently logged into the computer system through a service interface, and adding an entry to the conflict list for each user currently logged into the computer system through a corresponding service interface; and
checking if any user is currently logged into the computer system through a non-service interface, checking to determine, for each user currently logged into the computer system through a corresponding non-service interface, if that user has access to a respective logical partition to which is assigned one or more of the at least one shared resource or to which is assigned a logical device associated with one or more of the at least one shared resource, and adding an entry to the conflict list for each user currently logged into the computer system through the corresponding non-service interface and having said access, and
sending the conflict list for presentation to the new user.

19. The computer program product as recited in claim 18, wherein the executable instructions, when executed by the at least one processor in the digital computing device, cause the digital computing device to further perform the step of:
building a surveillance list in which is stored information about one or more users currently logged into the computer system, wherein the information stored in the surveillance list includes, for each user currently logged into the computer system, an Interface ID that identifies whether that user is logged into the computer system through a service interface or a non-service interface.

20. The computer program product as recited in claim 19, wherein the step of building a conflict list includes the step of:
checking the surveillance list when the new user is logging into the computer system to determine if a given user currently logged into the computer system has access to a respective logical partition to which is assigned or with which is associated one of the computer resources that presents a possibility of conflict with actions of the new user.

21. The computer program product as recited in claim 18, wherein the executable instructions, when executed by the at least one processor in the digital computing device, cause the digital computing device to further perform the step of:
requesting the new user to enter an end-time indicating a time before or at which the new user anticipates logging off the computer system.

22. The computer program product as recited in claim 18, wherein each shared resource is physical hardware assigned to the appliance partition, wherein the one or more appliance partitions comprise a virtual I/O server (VIOS) partition, wherein the one or more logical partitions are assigned virtualized devices associated with the physical hardware, and wherein the one or more logical partitions do not have direct access to the physical hardware.

23. The computer program product as recited in claim 22, wherein the first interface of the new user is a service interface type comprising a hardware management console (HMC), and wherein each respective interface of the currently logged-in users is a non-service interface type.

24. The computer program product as recited in claim 22, wherein the first interface of the new user is a non-service interface type, and wherein the respective interface of at least one of the currently logged-in users is a service interface type comprising a hardware management console (HMC).

* * * * *